June 16, 1959  C. ARNOLD ET AL  2,890,468
CONTINUOUSLY ROTATING WORKPIECE CARRIER WITH PLURAL
WORKHOLDERS AND A TOOL CARRIER WHICH OSCILLATES
SYNCHRONOUSLY WITH THE WORKPIECE CARRIER
DURING THE TOOL OPERATION
Filed Sept. 7, 1956
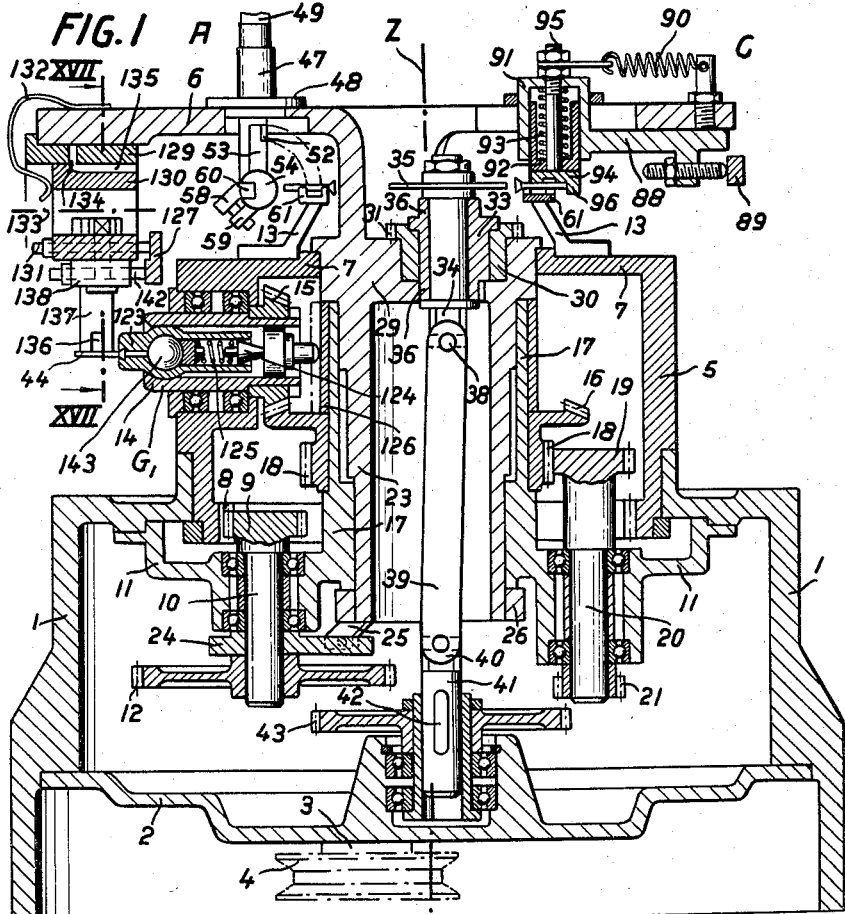
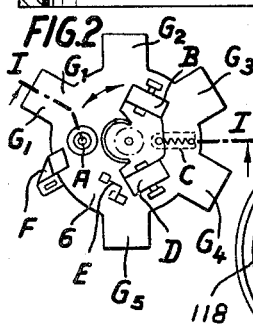
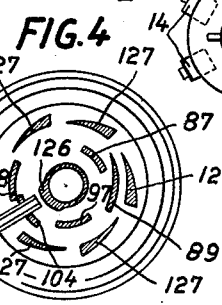
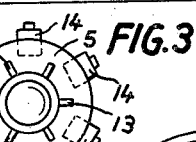
INVENTOR:
Carl Arnold
and
Heinrich Brandt
BY: Michael S. Striker
Agt.

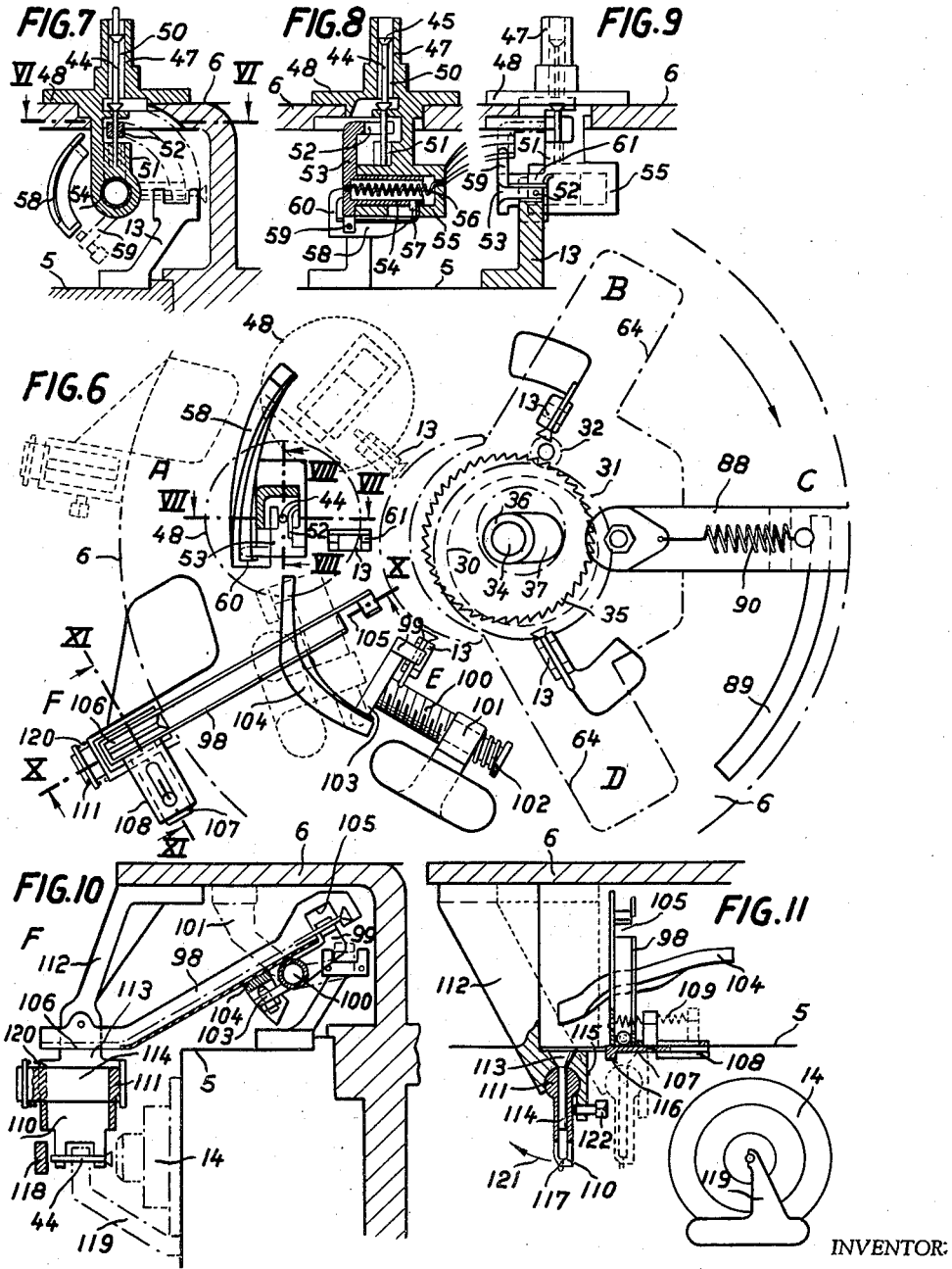

June 16, 1959
C. ARNOLD ET AL
2,890,468
CONTINUOUSLY ROTATING WORKPIECE CARRIER WITH PLURAL
WORKHOLDERS AND A TOOL CARRIER WHICH OSCILLATES
SYNCHRONOUSLY WITH THE WORKPIECE CARRIER
DURING THE TOOL OPERATION
Filed Sept. 7, 1956
3 Sheets-Sheet 3
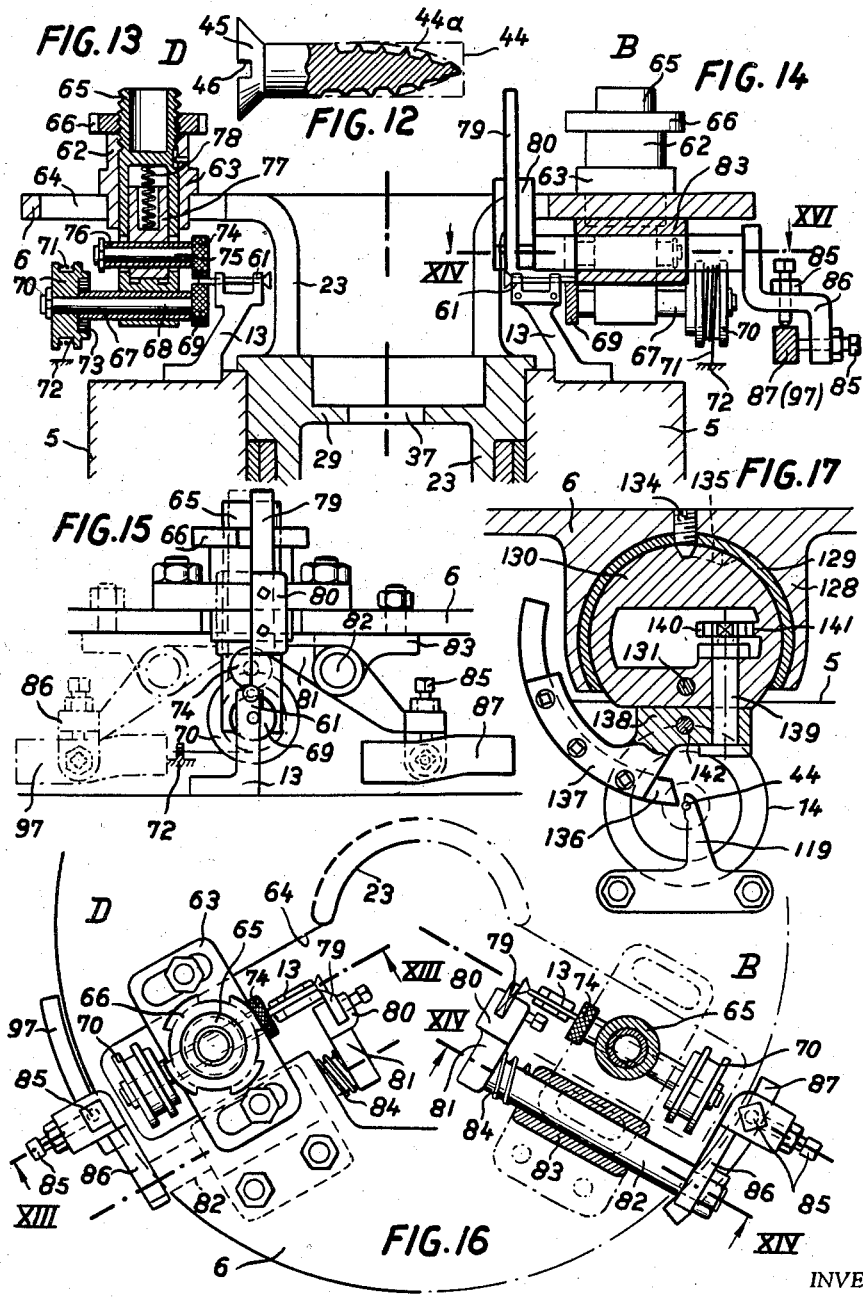
INVENTOR:
Carl Arnold
and
Heinrich Brandt
BY: Michael S. Striker
agt.

United States Patent Office 2,890,468
Patented June 16, 1959

2,890,468
CONTINUOUSLY ROTATING WORKPIECE CARRIER WITH PLURAL WORKHOLDERS AND A TOOL CARRIER WHICH OSCILLATES SYNCHRONOUSLY WITH THE WORKPIECE CARRIER DURING THE TOOL OPERATION

Carl Arnold and Heinrich Brandt, Montabaur (Westerwald), Germany, assignors to Carl Arnold, Montabaur (Westerwald), Germany Application September 7, 1956, Serial No. 608,550

18 Claims. (Cl. 10—2)

The invention concerns a rotatory automatic machine of the merry-go-round type with a rotatable workpiece carrier on which are arranged at equal angular distances, several workpiece holders; this tool carrier has spaced on it at the same angular distances the tools required for processing the workpiece.

In known rotary automatics of this type the workpieces are brought to the tools by a rotating workpiece carrier disc movable step-by-step, to the circumference of which the workpieces are securely fixed: while the workpieces are being processed, the rotating disc is stationary. After completion of an operation the rotating disc is indexed further on and the workpiece brought to the next tool.

In contrast to this, the invention provides a workpiece carrier running continuously at constant angular velocity. The tool carrier is an oscillating table which, during an operation, rotates synchronously with the workpiece carrier from a constant initial position. After each operation it can be automatically returned to its initial position through an angular distance equal to the spacing of the workpiece holders. The processing, feed and work location devices carried by the oscillating table can be controlled by means of templates which are firmly fixed within the oscillation range of these devices.

By this a considerable advantage is achieved over the known rotary automatic machines. First, there is a considerable simplification in the construction of the machine. In known machines guiding instruments are required for each tool. In accordance with the present invention, they are replaced by simple fixed curved guide pieces.

Moreover, an increase of working speed is possible. With known rotary machines with indexing means, the indexing movement and locking must be made dependent on the workpiece spindle speed. Therefore, stepped work processes can only be done by adjusting the tool several times at one tool station. An example of this is thread cutting where the tool has to be adjusted several times and then the tool always has to be relocated in the thread already partly cut so that this operation can not be distributed to different tool stations. For this reason operations of this and similar types can not be further broken down to increase production. Moreover this is, e.g. for screw manufacture (wood screws), very important because otherwise the thread cutting time would be several times greater than the other operation times (e.g. head and shank processing). The length of the stationary period of the rotating workpiece carrier would therefore depend on the period of the longest operation. This would result in all tools with short times of operation not being fully utilised. To prevent this, several such tools were grouped together at a common work station and controlled to operate during the stationary period one after the other. Thereby the entire control and arrangement of the tools became very difficult because each tool had its own rotating cam disc or cylinder cam in order to guide the adjustment, cutting depth, feed and return of the tool.

In the machine according to the invention, on the other hand, by an easily obtainable ratio between the speeds of the continually rotating workpiece carrier and the workpiece spindles, the operation breakdown can be so arranged that all processing steps require about the same time. Neither tool-turrets nor multiple curved control cam sections are required. For example, a thread cut can be divided as desired so that each cut can be done with a tool suited to it. Example: tool 1 is a roughing tool; tool 2 for deepening the incision; tool 3 for shaping the thread flanks; tools 4 and 5 producing the final form of the thread (planing, smoothing). This can generally be applied to other operations which results in great adaptability of the machine to different required operations. At no tool station is more than one tool with associated guide member required. This great adaptability compared with known types and the opportunity of most extensive work division by a machine arrangement which is nevertheless simple results in a considerable saving of time in work piece processing and therefore in a correspondingly high output.

As the arrangement of numerous tools on a single curved circumference in certain circumstances would require too great a machine diameter a further aspect of the invention is to arrange the tools, if necessary, in several superimposed working planes, the workpiece being transferred from a higher to a lower working plane by the force of gravity or mechanically. Here it is useful to reverse a workpiece which has to be processed at both ends (e.g. a screw with turned head) during movement between two working planes, since without this the piece has to be taken out. During its vertical movement the work piece can be easily subjected to a simultaneous radial movement.

For the present state of technology it may be mentioned that a multispindle automatic lathe is known which has a rotating workpiece spindle carrier cooperating with a tool carrier rotating synchronously with it, but which cannot, however, be indexed back to its initial position after each operation. Each individual workpiece on a workpiece spindle carrier is completely processed during one rotation of the workpiece spindle carrier by a tool spindle of the tool spindle carrier rotating synchronously with the workpiece spindle carrier. This is relatively simple when processing is carried out with a single tool. If, on the other hand, several tools are required for processing they must be arranged so that they can be switched to each tool holder which requires a multiplicity of tools and associated guiding cams because each of the many tools would have to be controlled by another cam. At the feed and delivery stations the tools would be idle.

A rotary automatic machine according to the invention shown in the drawing in which:

Figure 1 is a vertical axial section approximately along the broken line I—I of Figure 2.

Figure 2 is a greatly reduced plan view of the tool carrier which oscillates back and forth.

Figure 3 is an equally reduced plan view of the constantly rotating workpiece carrier.

Figure 4 is a plan view of the rigid parts of the machine, especially the guide cams for the tools.

Figure 5 is a horizontal cross section through the base of the machine with drive means.

Figure 6 is a plan view of the feed, transfer and reversal devices for the workpiece, which are fixed to the oscillating tool carrier; and a device for slotting a screw head.

Figure 7 is a vertical axial section through the feed device along line VII—VII of Figure 6.

Figure 8 is a vertical section along line VIII—VIII of Figure 6 through feed device in the initial position of the oscillating tool carrier.

Figure 9 is a view seen in the same direction (radial) of the feed device in the final position of the tool carrier.

Figure 10 is a vertical section along line X—X of

Figure 6 through the transfer and reversal devices.

Figure 11 is a section through these devices along line XI—XI of Figure 6.

Figure 12 is a partially sectioned view of a woodscrew to be manufactured in the machine.

Figure 13 is a vertical section along line XIII—XIII of Figure 16 through the drive to the workpiece at the station serving to process the screw head.

Figure 14 is a vertical section through the accompanying tool carrier along line XIV—XIV of Figure 16.

Figure 15 is a front view, seen from the centre point of the tool carrier, of the tool station lying to the right in Figure 16.

Figure 16 is a plan view of two such stations, that on the right sectioned horizontally along line XVI—XVI of Figure 14.

Figure 17 is a vertical section along line XVII—XVII of Figure 1 through the tool holder of a thread cutting device.

The machine has a hollow base 1 which contains the drive means (Figures 1 and 5). A floor 2, inserted in the base from below, carries the bearing for the main driving shaft 3, to the extruding end of which a belt pulley 4 or similar device is fastened. From this shaft all movements of the workpiece carrier 5 (rotating at constant speed) and the tool carrier 6 (which only carries out a part revolution and then returns to its initial position) are derived. The continuously rotating workpiece carrier 5 consists of a hollow cylinder whose upper end is closed by a rotating disc 7, whilst at its lower end it has internal toothing 8 for a pinion 9. This pinion is set on an intermediate shaft 10 which is borne in an intermediate floor 11 of the base 1, and is driven by a spur wheel 12 from the main shaft 3 (Figures 1 and 5). In the illustrated embodiment there are six rigid workpiece holders 13 fixed at equal angular distances (e.g. 60°) on disc 7. Around the circumference of the cylindrical part 5, there is the same number of continually rotating workpiece holders 14, also equally spaced (Figure 3). It is convenient to arrange these two types of workpiece holders 13 and 14 alternately around the carrier. Each of the rotating workpiece holders 14 has a bevel gear 15 (Figure 1) which meshes with a central bevel gear 16. The bevel gear 16 runs on a neck 17 extending upwards from the intermediate floor 11, and is connected with a coaxial spur gear 18 which meshes with a pinion 19. The shaft 20 of the pinion 19 is fixed in the intermediate floor 11 of the base (Figure 1), and at its lower end has a further pinion 21 which is driven through an intermediate shaft 22 by the main shaft 3 (Figure 5). The drive of the rotating workpiece carrier 5 and the drive of the rotating workpiece holders 14 are adjusted to each other, for a reason to be explained later, in such a way that each of the rotating workpiece holders 14 on reaching the next work place regains the same zero position as in the previous station. The oscillating tool carrier 6 consists principally of a disc on or under whose surface and at whose circumference the different tools are arranged. The tool carrier 6, which in the following is referred to as an "oscillating table," extends downwards as a hollow shaft 23 which fits into the bearing 17 of the intermediate floor 11, and is coaxial with rotating workpiece carrier 5. The turning movement of the oscillating table 6 is controlled by a cam disc 24 (Figures 1 and 5) which fits on to the intermediate shaft 10. On the circumference of this cam disc slides the free end of a rocking lever 25, whose boss 26 is fastened on the lower end of the shaft 23, and to whose lever arm 27 a return spring 28 is attached (Figure 5). The spring 28 is fastened to the intermediate floor 11 and holds the rocking lever in constant contact with the periphery of the cam disc 24. Further, it turns the oscillating table 6 back to its initial position after the rising part of the cam disc has forced the oscillating table during part of revolution in the same direction as the rotating workpiece carrier 5. The cam disc 24 is so designed that its rising part imparts to the oscillating table 6 the same angular velocity as that of the rotating workpiece carrier, while its receding cam track part is steeper, so that the return movement of the oscillating table to its initial position is carried out at a considerably greater speed. In this way, the result is obtained that of the angular distance (60°) which is traversed by the workpiece between two successive stations, the greater part (40 to 50°) is available for tool operations and a considerably lesser part (20 to 10°) for the idle return. In the hollow shaft 23 of the oscillating table 6, there is an intermediate floor 29 arranged on the level of the rotating disc 7 in which floor, eccentrically to the common axis Z—Z of the workpiece carrier 5 and the oscillating tool carrier 6, 23, there is an adjustment box 30 loosely pivoted (Figure 1). It has a toothed rim 31 on the part projecting above the intermediate floor, which meshes with an adjustment pinion 32 (e.g. turnable by means of a key) as shown in Fig. 6. Eccentric to the turning axis of this adjustment box 30 is pivoted a bearing bush 33, whose bearing bore is eccentric to the central axis; and turnably supports the driving shaft 34 of a circular saw blade 35. At both ends of the saw shaft 34, the bearing bush 33 has pilot bushes 36 concentric to the shaft which are constrained to move linearly by a radial slot 37 of the intermediate floor 29 and a guide plate (not shown) (Figures 6, 13, and 14). The saw shaft is connected by a universal joint 38 with a universal shaft 39 connected by a second universal joint 40 with a drive shaft 41 which is set in the lower floor 2 and is axially adjustable by a sliding wedge 42, but immovably coupled with a spur gear 43 driven by the main shaft 3. The saw blade is, therefore, driven continuously.

The method of working of the machine and characteristics of the individual processing devices are explained hereafter by following a workpiece through the various operations.

The workpiece is a blank from which a woodscrew with a countersunk head is to be manufactured (Figure 12). A pressing is used as the blank which consists of a cylindrical shank 44 (dot-dash line in Figure 12) with a truncated cone shaped head 45. The work process to be carried out by the machine is therefore composed of the following stages: Feed and setting of the workpiece, facing the head 45, sawing the screw slot 46, turning of the cone surface on the screw head, release and transfer of the workpiece to a lower work plane, reverse setting of the workpiece to process the shank 44, turning of the woodscrew thread with simultaneous formation of screw point along a convex outline, and ejection of the workpiece.

Device A (Figure 2) serves to feed the workpiece. It is shown in Figures 1 and 6 to 9 in different working positions and includes a guide nozzle 47, which is fastened to the oscillating carrier 6 by means of a flange 48 and connected by means of a flexible tube 49 or similar equipment (Figure 1) with a magazine which is not shown. The nozzle has a through vertical bore 50, whose width corresponds to the head diameter of the workpiece. The workpieces slide head upwards into the bore of the nozzle 47 and from there pass under the oscillating carrier table 6 into a slot 51 which is cut away so that the spring jaw 52 of a lever arm 53 can grip the shank 44 of the workpiece (Figures 6, 7 and 8). The gripping lever 53 is mounted on a hollow horizontal journal 54, movable and also axially adjustable and the journal fits into a box 55 which is rigidly fixed to the nozzle 47 under the slot 51 (Figure 8). The journal 54 and the box 55 hold a helical spring 56 which acts on the journal as a pressure spring and urges it axially out of the guide box 55 (in Figure 8 to the left). This axial displacement of the journal 54 is limited by a stop pin 57 fastened to it which slides in a short longitudinal slot in the guide box 55. The spring 56, however, acts on the journal 54 also as a turning spring and as such urges the gripping lever 53 to turn out of the vertical position (Figures 7 and 9) in which it holds the workpiece 44, into the horizontal position (Figure 7, dot-dash position and Figure 9), in which it transfers the workpiece to a rigid workpiece holder 13. Both the axial movement and the tilting movement of the gripping lever 53 are controlled by a fixed guide rail 58, on which slides the free end of a guide lever 59 fixedly connected with gripping lever 53, and which on one of its ends (in Figure 8, left end) has a stop 60 in the axial path of the journal 54 (Figures 6 and 8). When the oscillating carrier table 6 is in its initial position (Figures 1 and 6, solid lines) then the journal 54 of the gripping lever 53 is pressed into its guide box 55 by the stop 60 of guide rail 58, compressing spring 56, whilst the guide rail 58 holds the gripping lever 53 in its vertical position. If the oscillating carrier 6 now begins its forward movement in the same direction as the rotating workpiece carrier 5, then the entire feed device moves away from the stop 60 into the dotted position of Figure 6. Consequently spring 56 thrusts the journal 54 of gripping lever 53 straight out of the box 55 (to the left) until the pin 57 stops at the end of the longitudinal slot of box 55. This axial displacement of gripping lever 53 has however been sufficient to draw the workpiece 44 out of the holding slot 51 of the feeding station 47. The gripping lever 53 can now be turned downwardly by spring 56. The workpiece, held by jaw 52, is in the position located by pin 57 exactly over the spring extended mouth 61 of workpiece holder 13 which is ready to take it, as it is pushed in by the head of the descending gripping lever 53. (Figures 1 and 6, dot-dash position and Figure 9.) Now when the oscillating carrier remains stationary at the end of its travel and runs back to its initial position under the effect of the return spring 28, the closed head 61 of the workpiece holder 13 draws the workpiece horizontally out of the jaw 52 which is open in this direction, and transports it to the subsequent processing points. On the return movement of the oscillating carrier 6 the gripping lever 53 is raised again into its vertical position by guide rail 58 and at the end of the return movement the journal 54 of the gripping lever 53 hits against the end stop 60 of the guide rail so that it is again thrust into its guide box 55 against the action of spring 56. Then the gripping lever 53 which is rigidly fixed to it is also thrust to the right so that the next workpiece, which has meanwhile fallen from the nozzle 47 into the slot 51, can be pushed into the open jaw 52 whereupon the sequence described is repeated in the same way.

At the following first processing point B (Figure 2) the front surface of the screw head 45 is now faced (Figure 12). For this a drive device on oscillating carrier table 6 is used which turns the workpiece, and also a linearly adjustable and tiltable lathe tool holder. The assembly at the drive device can be seen from Figures 13 and 16. It consists principally of a housing 62, which is fastened vertically by means of a base plate 63 over a cutout 64 of the oscillating table 6 (Figure 16). In the housing there is a tube 65 which can be moved axially but not turnable and which can be set by a nut 66 at the required level. In the lower end of the tube 65 the sleeve 67 for a drive shaft 68 is fixed. The shaft 68 carries on its end nearest the tool holder 13 a drive roller 69 which at its circumference is knurled or has some other friction inducing medium, and at its other end has a pulley 70 on which a steel rope 71 or other belt means is wound. One end of the steel rope 71 is fastened at the circumference of the pulley 70 whilst the other end is secured to a fixed point 72 (e.g. to one of the fixed guide rails), so that the rope is wound off the pulley 70 when the oscillating carrier 6 moves forward and effects turning on the pulleys with shaft 68. When the oscillating carrier 6 moves back, the steel rope is wound up again by a turning spring 73 inside the pulley. The drive roller 69 cooperates with a roller 74 set above it, its shaft 75 being pivoted in a sleeve 76. This sleeve is fastened in a piston 77 which is mounted in pipe 65, movable axially but not turnable, and which is under the action of a compression spring 78 which urges the sleeve downwardly. As soon as work position B is reached, the end of the shank of workpece 44 (which points radially outwards) is thrust between the two rollers 69 and 74 by the rotation of workpiece carrier 5. Now, when the oscillating carrier 6 starts its forward movement, the pulley 70 and with it the lower driving roller 69 carries out a rapid rotation so that the workpiece rotates in its holder 13.

The tool 79 is used for turning operation and is set in a tool holder 80, which is fastened to a shaft 82 by means of lever arm 81. The shaft 82 is pivoted and movable axially in a bearing block 83 fastened to the underside of the oscillating table 6. It is under the action of a spring 84 which acts both as a pressure spring and a a turning spring on the shaft in such a way that the guide lever 86, which is connected with the shaft and has two set screws at right angles to each other, is held in constant contact with guide rail 87. This guide rail is shaped in such a way that its upper edge activates the starting, feeding in and lifting off the turning tool, whilst its lateral surface can impart a longitudinal thrust to the turning tool when the shape of the screw head requires it.

After the oscillating table 6 has carried out its part turn, the turning tool 79 is lifted from the workpiece. Now the oscillating table starts its backward movement whilst the rotating workpiece carrier 5 moves the workpiece holder on to the second processing station C (Figure 2). Here the screw head 45 is given the slot 46. This is done by the continuously rotating circular saw 35 whose cutting depth can be adjusted by radial movement of the saw shaft by means of the eccentric adjustment box 30. The start and feeding in of the workpiece against the saw blade 35 is done by a slide 88. This is radially movable on the under side of the oscillating table 6 and controlled by a guide rail 89 with which it is held in constant contact by a return spring 90 (Figures 1 and 6). In the head 91, which is directed radially inward, there is mounted a piston 92 movable in vertical direction. This is under the action of a compression spring 93, and acts on a pressure piece 94 which is fastened to piston 92 and the bolt 95 penetrating the slide head 91 axially so that during the operation it presses against the workpiece so that it is securely held in the mouth 61 of holder 13 (Figure 1). At the outer end of the pressure piece 94 there is a nose 96 projecting downwards which catches the outer end of the workpiece. The nose 96 feeds the workpiece inwards during the forward movement of the oscillating table and supports it against the saw pressure.

After the screw slot has been cut, the oscillating table 6 returns to its initial position, whilst the workpiece holder 13 reaches simultaneously the third processing station D (Figure 2) where the cone surface of the screw head 45 is turned. The device for this corresponds to the processing device B which has been discussed in connection with Figures 13 to 16, and consists of a drive device for the workpiece and a turning tool holder which is steered by a guiding rail 97.

During the processing of the screw head 45 described, the shank 44 of the workpiece was fixed in the rigid workpiece holder 13. In the subsequent processing of the screw shank 44 the screw head 45 must be held. Therefore a reversal of the workpiece is required. Since, moreover, the requisite processing parts for production of the screw thread can in certain cases, not be placed in the previous working plane over the rotating carrier 5 without increasing the diameter of the machine excessively, the further processing stations are transferred to a working plane situated below the other stations and the reversal of the workpiece is carried out as the final movement of the transfer motion required to bring the workpiece to the lower working plane.

For this purpose a transfer device is arranged at station E (Figure 2) which lifts the workpiece out of the previously operative holder 13 and transfers it to a fixed chute 98 (Figures 4, 6, 10 and 11) down which the workpiece slides to the lower work-plane.

The transfer device consists of a lever shaped grip member 99 whose spring-loaded jaw is opened toward the turning direction of the rotating carrier disc 5. The lever arm of the grip 99 is fastened to the end of a shaft 100 which is pivoted and movable axially in a bearing block 101 fastened to the underside of the oscillating carrier table 6 (Figures 6 and 10). The turning pin is under the action of a spring 102 which, as a pressure spring, acts on the grip back against axial movement. On the other hand, working as a turning spring it tends to keep a control lever 103 (connected with shaft 100) in constant contact with a guide rail 104 steering the movement of grip 99. Through the rotation of the rotating disc 5 and the counter rotation of the oscillating table 6 returning to its initial position, the workpiece is thrust by the holder 13 into the sprung mouth of the transfer grip 99 and held fast there (Figure 6). In the subsequent common forward movement of rotating disc 5 and oscillating table 6 the grip 99 is forced upwards about its turning axis by the pressure of the guide rail 104. Thus it lifts the workpiece out of the upwards open jaw 61 of the holder 13 and lifts it up to the chute 98 which is inclined outwards (Figure 10). The head of the grip member now runs through a cutaway 105 in the chute, just wide enough for it; the workpiece, protruding on both sides of the cutaway is brushed out of the grip jaw and laid on the chute, down which it slides point first. The grip member 99 is now completely turned out of the path of holder 13, so that the holder can run past the grip member when the same returns to its initial position.

At the lower end there is the bottom of the chute 98 with a cutaway 106 which, at the moment of arrival of the workpiece, is closed by a slide 107 (Figure 11). This slide is movable laterally in a guide 108 fastened to the chute 98 and is under the action of a spring 109 which tends to hold it in its blocking position.

The reversal device F which follows now (Figure 2) consists principally of a grip member 110 which is movably suspended by means of a turning pin 111 in a carrier 112 on the underside of the oscillating carrier table 6. The lower end of this carrier is shaped like a funnel 114 which opens below in a vertical slot 114 through the turning pin 111 and the grip 110. In the return movement of carrier table 6, as soon as the front edge 115 meets the nose 116 of slide 107 (which projects downwards), the slide is opened against the action of the spring 109 and the workpiece falls through the funnel 113 and slot 114 into grip member 110 where it is firmly held by a spring 117. The head 45 of the workpiece is then directly opposite the jaws of one of the rotating workpiece holders 14 which are arranged at the circumference of the continually rotating workpiece carrier 5. In the subsequent forwards movement of the oscillating table 6 the workpiece 44 in the grip member 110 is thrust radially inwardly by a guide rail 118 and therefore, head first into the open jaws of the rotating workpiece holder 14 which now close automatically. In the stop period and return movement of the oscillating table 6 which now follows, the workpiece 44 is drawn out of the spring jaw of grip member 110 by the jaws of workpiece holder 14 and a member 119 working with it (Figure 11), whereupon the grip member is turned against the action of turning spring 120 (Figures 6 and 10) about its turning pin 111 in the direction of arrow 121 to facilitate the drawing of the workpiece out of the grip jaw. The grip member 110 then swings under the action of turning spring 120 back to its initial position which can be adjusted by a screw 122 on the carrier 112 to be central to the jaws of the rotating workpiece holder.

Each of the rotating workpiece holders 14 has a collet whose jaws 123, which are movable about a ball 143, can be closed by means of a clamping cone 124 which is movable axially between them; the clamping cone 124 is under the action of a spring 125 which presses its outer end against the periphery of a fixed cam 126 (Figures 1 and 4) on the bearing neck 17 of intermediate floor 11. The collet 123 is opened at the delivery station before the reversal point F so that the previous workpiece falls out and can be removed. Simultaneously the collet is ready to receive a new workpiece which is held by the head in the previously described manner. As the workpiece holder is continuously turned by the bevel gear 15, 16 the workpiece 44 is rotated continuously.

Therefore, continually rotating about its longitudinal axis, it reaches the following processing points $G_1$ to $G_5$ at which is cut the woodscrew thread on the ogival (point-shaped) core. For this purpose identical turning-tool holders (Figures 1 and 17) are arranged at all these working points, their movements being controlled by fixed guide rails 127 (Figure 4). On the underside of the oscillating carrier table 6 there is a bearing housing 128 for each turning-tool holder which has a bearing bush 129. In this there is a chiefly cylindrical support 130 which is movable axially and pivoted (Figures 1 and 17). The axial movement is imparted to the support 130 by the upper part of the guide rail 127 on which slides a probe 131 connected to the support. This movement is resisted by a return spring 132 (Figure 1). During its axial movement, the support 130 is turned about its longitudinal axis 133 (Figure 1), in order to bring the turning-tool to the workpiece and feed it to the necessary depth. This turning movement is given to the support by a guiding pin 134 constrained in an appropriately curved groove 135 on the periphery of the support. This groove could be replaced by a guide rail or similar device placed on the support.

Since the turning-tool 136 requires as little space as possible in its turning movement and can nevertheless be made very long it is curved like the arc of a circle whose center is on the turning axis 133 of the support. It is clamped fast in a tool-holder 137 which is curved accordingly, the base plate 138 of which is fastened on a vertical pivot 139. This pivot is pivoted in the support 130 and connected with a turning spring 140 at its upper end, the other end being fastened at 141 on the inner wall of the hollow support. The base plate 138 of the tool holder, which works as a turntable, also has an adjustable feeler 142 which slides, under the action of spring 140, on the lower part of guide rail 127. This part of the guide rail, for cylindrical screws (metal screws), can follow an arc concentric with the axis Z—Z of the machine so that it does not influence the position of the tool holder 137. On the other hand, in manufacturing wood screws whose thread core has an ogival longitudinal cross-section the guide rail is curved in such a way that the tool-holder is rotated during its movement along the workpiece so that the tool is always perpendicular to the outline of the thread core. This ensures that the thread has the required shape at all points and is never undercut.

The breakdown of the thread cutting between the five processing points has the advantage that at each work point work can be carried out with a small depth of cut, and each operation can be carried out during the part turn of the oscillating carrier table 6 in step with the other operations which only take a short time. This breakdown necessitates that the turning tool is relocated at exactly the same circumferential point of the workpiece at each of the processing points $G_1$ to $G_5$. This is achieved by the drive of the rotating workpiece holder 14 being taken from the main drive shaft 3 and calculated so that each of the workpiece holders 14 completes a number of complete revolutions during a part turn (60°) of the continually rotating workpiece carrier 5.

After the workpiece has run through the last processing point $G_5$ the feeling pin of clamping cone 124 meets the fixed cam 126 (Figure 4) and opens the collet 123. The completed workpiece now drops out at the delivery station and gets to its collecting box through a chute or similar device.

What we claim is:

1. In an automatic machine tool, in combination, a rotary work piece carrier; a set of workpiece holders mounted on said workpiece carrier spaced the same angular distance from each other; drive means for continuously rotating said workpiece carrier in one direction about an axis; an oscillatable tool carrier turnable about the axis of said workpiece carrier; a set of tool holders mounted on said tool carrier; a set of tools respectively mounted in said tool holders and adapted to perform operations on workpieces held in said workpiece holders when said workpiece holders and said tool holders are in a predetermined relative position in which pairs of workpiece holders and tool holders are associated; transmission means connecting said workpiece carrier with said tool carrier for turning said tool carrier in an oscillating movement while said workpiece carrier moves through each of said angular distances, said transmission means turning during each oscillating movement said tool carrier at the rotary speed of said workpiece carrier in said one direction so that said pairs of tool holders and workpiece holders move together, and returning said tool carrier with said tool holders and tool in an opposite direction until said tool holders are again in said predetermined position relative to said workpiece holders; a stationary support; and a plurality of control means mounted on said support and engaging selected holders of each pair of workpiece holders and tool holders during movement of said tool carrier and workpiece carrier in said one direction for operating the respective holders whereby successive operations are performed by said tools on workpieces, said control means releasing the respective holders during return movement of said tool carriers.

2. In an automatic machine tool, in combination, a rotary work piece carrier; a set of workpiece holders mounted on said workpiece carrier spaced the same angular distance from each other, and including movable workpiece holders; drive means for continuously rotating said workpiece carrier in one direction about an axis; an oscillatable tool carrier turnable about the axis of said workpiece carrier; a set of tool holders mounted on said tool carrier; a set of tools respectively mounted in said tool holders and adapted to perform operations on workpieces held in said workpiece holders when said workpiece holders and said tool holders are in a predetermined relative position in which pairs of workpiece holders and tool holders are associated; transmission means connecting said workpiece carrier with said tool carrier for turning said tool carrier in an oscillating movement while said workpiece carrier moves through each of said angular distances, said transmission means turning during each oscillating movement said tool carrier at the rotary speed of said workpiece carrier in said one direction so that said pairs of tool holders and workpiece holders move together, and returning said tool carrier with said tool holders and tools in an opposite direction until said tool holders are again in said predetermined position relative to said workpiece holders; a stationary support; and a plurality of control means mounted on said support and engaging said movable workpiece holders during movement of said tool carrier and workpiece carrier in said one direction for operating the respective holders, whereby successive operations are performed by said tools on workpieces, said control means releasing the respective holders during return movement of said tool carriers.

3. In an automatic machine tool, in combination, a rotary workpiece carrier; a set of workpiece holders mounted on said workpiece carrier spaced the same angular distance from each other; drive means for continuously rotating said workpiece carrier in one direction about an axis; an oscillatable carrier turnable about the axis of said workpiece carrier; a set of tool holders mounted on said tool carrier, and including movable tool holders; a set of tools respectively mounted in said tool holders and adapted to perform operations on workpieces held in said workpiece holders when said workpiece holders and said tool holders are in a predetermined relative position in which pairs of workpiece holders and tool holders are associated; transmission means connecting said workpiece carrier with said tool carrier for turning said tool carrier in an oscillating movement while said workpiece carrier moves through each of said angular distances, said transmission means turning during each oscillating movement said tool carrier at the rotary speed of said workpiece carrier in said one direction so that said pairs of tool holders and workpiece holders move together, and returning said tool carrier with said tool holders and tool in an opposite direction until said tool holders are again in said predetermined position relative to said workpiece holders; a stationary support; and a plurality of control means mounted on said support and engaging said movable tool holders during movement of said tool carrier and workpiece carrier in said one direction for operating the respective holders whereby successive operations are performed by said tools on workpieces, said control means releasing the respective holders during return movement of said tool carriers.

4. In an automatic machine tool, in combination, a rotary workpiece carrier; a set of workpiece holders mounted on said workpiece carrier spaced the same angular distance from each other, and including movable workpiece holders; drive means for continuously rotating said workpiece carrier in one direction about an axis; an oscillatable tool carrier turnable about the axis of said workpiece carrier; a set of tool holders mounted on said tool carrier, and including movable tool holders; a set of tools respectively mounted in said tool holders and adapted to perform operations on workpieces held in said workpiece holders when said workpiece holders and said tool holders are in a predetermined relative position in which pairs of workpiece holders and tool holders are associated; transmission means connecting said workpiece carrier with said tool carrier for turning said tool carrier in an oscillating movement while said workpiece carrier moves through each of said angular distances, said transmission means turning during each oscillating movement said tool carrier at the rotary speed of said workpiece carrier in said one direction so that said pairs of tool holders and workpiece holders move together, and returning said tool carrier with said tool holders and tool in an opposite direction until said tool holders are again in said predetermined position relative to said workpiece holders; a stationary support; and a plurality of control means mounted on said support and including first control means for engaging and operating said movable workpiece holders, and second control means for engaging and operating said movable tool holders during movement of said tool carrier and workpiece carrier in said one direction whereby successive operations are performed by said tools on workpieces, said control means releasing the respective holders during return movement of said tool carriers.

5. An apparatus as set forth in claim 4 wherein at least one of said workpiece holders include clamping jaws for holding a workpiece, cam follower means for operating said jaws, and wherein said control means include a timing cam engaging said cam follower means for operating said clamping jaws.

6. An apparatus as set forth in claim 4 wherein one of said tools is a rotary circular saw means having a shaft; wherein one of said tool holders supports said shaft for rotation and is eccentrically mounted on said tool carrier; means for adjusting the position of said eccentric tool holder; means for connecting said shaft with said drive means; and operating means mounted on said tool carrier for moving workpieces toward said saw means during rotation of said tool carrier in said one direction.

7. In an automatic machine tool, in combination, a rotary workpiece carrier; a set of workpiece holders mounted on said workpiece carrier spaced the same angular distance from each other; drive means for continuously rotating said workpiece carrier in one direction about an axis; an oscillatable tool carrier turnable about the axis of said workpiece carrier; a set of tool holders mounted on said tool carrier; a set of tools respectively mounted in said tool holders and adapted to perform operations on workpieces held in said workpiece holders when said workpiece holders and said tool holders are in a predetermined relative position in which pairs of workpiece holders and tool holders are associated; transmission means connecting said workpiece carrier with said tool carrier for turning said tool carrier in an oscillating movement while said workpiece carrier moves through each of said angular distances, said transmission means turning during each oscillating movement said tool carrier at the rotary speed of said workpiece carrier in said one direction so that said pairs of tool holders and workpiece holders move together, and returning said tool carrier with said tool holders and tool in an opposite direction until said tool holders are again in said predetermined position relative to said workpiece holders; a stationary support; a plurality of control means mounted on said support and engaging selected holders of each pair of workpiece holders and tool holders during movement of said tool carrier and workpiece carrier in said one direction for operating the respective holders whereby successive operations are performed by said tools on workpieces, said control means releasing the respective holders during return movement of said tool carriers; and operating means mounted on said tool carrier and adapted to engage and move workpieces on selected workpiece holders, said operating means including a member connected to said support for actuating said operating means during movement of said tool carrier in said one direction.

8. In an automatic machine tool, in combination, a rotary workpiece carrier; a set of workpiece holders mounted on said workpiece carrier spaced the same angular distance from each other; drive means for continuously rotating said workpiece carrier in one direction about an axis; an oscillatable tool carrier turnable about the axis of said workpiece carrier; a set of tool holders mounted on said tool carrier; a set of tools respectively mounted in said tool holders and adapted to perform operations on workpieces held in said workpiece holders when said workpiece holders and said tool holders are in a predetermined relative position in which pairs of workpiece holders and tool holders are associated; transmission means connecting said workpiece carrier with said tool carrier for turning said tool carrier in an oscillating movement while said workpiece carrier moves through each of said angular distances, said transmission means turning during each oscillating movement said tool carrier at the rotary speed of said workpiece carrier in said one direction so that said pairs of tool holders and workpiece holders move together, and returning said tool carrier with said tool holders and tool in an opposite direction until said tool holders are again in said predetermined position relative to said workpiece holders; a stationary support; a plurality of control means mounted on said support and engaging selected holders of each pair of workpiece holders and tool holders during movement of said tool carrier and workpiece carrier in said one direction for operating the respective holders whereby successive operations are performed by said tools on workpieces, said control means releasing the respective holders during return movement of said tool carriers; a pair of friction rollers turnably mounted on said tool carrier and adapted to engage workpieces mounted in a selected workpiece holder during turning movement of said tool carrier in said one direction; a pulley connected to one of said friction rollers; a string means connected at one end to said pulley and at the other end to said support so as to rotate said one friction roller and thereby said workpiece during movement of said tool carrier in said one direction; and means for turning said pulley in opposite direction during movement of said tool carrier in said opposite direction whereby said string means is wound on said pulley.

9. In an automatic machine tool, in combination, a rotary workpiece carrier; a first set of first workpiece holders mounted on said workpiece carrier spaced the same angular distance from each other; a second set of second workpiece holders mounted on said workpiece carrier below said first set of workpiece holders; drive means for continuously rotating said workpiece carrier in one direction about a vertical axis; an oscillatable tool carrier turnable about the axis of said workpiece carrier; two sets of tool holders mounted on said tool carrier; two sets of tools respectively mounted in said tool holders and adapted to perform operations on workpieces held in said workpiece holders when said workpiece holders and said tool holders are in a predetermined relative position in which pairs of workpiece holders and tool holders are associated; transmission means connecting said workpiece carrier with said tool carrier for turning said tool carrier in an oscillating movement while said workpiece carrier moves through each of said angular distances, said transmission means turning during each oscillating movement said tool carrier at the rotary speed of said workpiece carrier in said one direction so that said pairs of tool holders and workpiece holders move together, and returning said tool carrier with said tool holders and tools in an opposite direction until said tool holders are again in said predetermined position relative to said workpiece holders; a stationary support; a plurality of control means mounted on said support and engaging selected holders of each pair of workpiece holders and tool holders during movement of said tool carrier and workpiece carrier in said one directon for operating the respective holders whereby successive operations are performed by said tools on workpieces, said control means releasing the respective holders during return movement of said tool carriers; a chute on said workpiece carriers connecting a selected workpiece holder of said first set with a selected workpiece holder of said second set of workpiece holders; a transfer device mounted on one of said carriers and including a first transfer member for transferring a workpiece from said selected workpiece holder of said first set of first workpiece holders to said chute, and a second transfer member for transferring the workpiece from said chute to said selected workpiece holder of said second set of second workpiece holders; and means on said support for operating said first and second transfer members during movement of said carriers.

10. In an automatic machine tool, in combination, a rotary workpiece carrier; a first set of first workpiece holders mounted on said workpiece carrier spaced the same angular distance from each other; a second set of second workpiece holders mounted on said workpiece carrier below said first set of workpiece holders; drive means for continuously rotating said workpiece carrier in one direction about a vertical axis; an oscillatable tool carrier turnable about the axis of said workpiece carrier; two sets of tool holders mounted on said tool carrier; two sets of tools respectively mounted in said tool holders and adapted to perform operations on workpieces held in said workpiece holders when said workpiece holders and said tool holders are in a predetermined relative position in which pairs of workpiece holders and tool holders are associated; transmission means connecting said workpiece carrier with said tool carrier for turning said tool carrier in an oscillating movement while said workpiece carrier moves through each of said angular distances, said transmission means turning during each oscillating movement said tool carrier at the rotary speed of said workpiece carrier in said one direction so that said pairs of tool holders and workpiece holders move together, and returning said tool carrier with said tool holders and tools in an opposite direction until said tool holders are again in said predetermined position relative to said workpiece holders; a stationary support; a plurality of control means mounted on said support and engaging selected holders of each pair of workpiece holders and tool holders during movement of said tool carrier and workpiece carrier in said one direction for operating the respective holders whereby successive operations are performed by said tools on workpieces, said control means releasing the respective holders during return movement of said tool carriers; a chute on said workpiece carrier connecting a selected workpiece holder of said first set with a selected workpiece holder of said second set of workpiece holders; a transfer device including a first grip member mounted on said tool carrier for gripping a workpiece held in said selected workpiece holder of said first set of first workpiece holders during movement of said tool holder in opposite direction; a control guide member on said support for actuating said first grip member during movement of said tool carrier and said workpiece carrier in said one direction of rotation to place a gripped workpiece in said chute; a second gripping member for gripping the workpiece in a lower portion of said chute; and another control guide member on said support for operating said second gripping member during movement of said carriers in said one direction to place the gripped workpiece in said selected workpiece holder of the set of second workpiece holders.

11. In an automatic machine tool, in combination, a rotary workpiece carrier; a set of workpiece holders mounted on said workpiece carrier spaced the same angular distance from each other; drive means for continuously rotating said workpiece carrier in one direction about an axis; an oscillatable tool carrier turnable about the axis of said workpiece carrier; a set of tool holders mounted on said tool carrier; a set of tools respectively mounted in said tool holders and adapted to perform operations on workpieces held in said workpiece holders when said workpiece holders and said tool holders are in a predetermined relative position in which pairs of workpiece holders and tool holders are associated; transmission means connecting said workpiece carrier with said tool carrier for turning said tool carrier in an oscillating movement while said workpiece carrier moves through each of said angular distances, said transmission means turning during each oscillating movement said tool carrier at the rotary speed of said workpiece carrier in said one direction so that said pairs of tool holders and workpiece holders move together, and returning said tool carrier with said tool holders and tool in an opposite direction until said tool holders are again in said predetermined position relative to said workpiece holders, said transmission means including a cam means driven from said drive means, a cam follower means connected to said oscillatable tool carrier for turning the same in said one direction, and spring means for turning said tool carrier in said opposite direction; a stationary support; and a plurality of control means mounted on said support and engaging selected holders of each pair of workpiece holders and tool holders during movement of said tool carrier and workpiece carrier in said one direction for operating the respective holders whereby successive operations are performed by said tools on workpieces, said control means releasing the respective holders during return movement of said tool carriers.

12. In an automatic machine tool, in combination, a rotary workpiece carrier; a set of workpiece holders mounted on said workpiece carrier spaced the same angular distance from each other; drive means for continuously rotating said workpiece carrier in one direction about an axis; an oscillatable tool carrier turnable about the axis of said workpiece carrier; feeding means on said tool carrier for feeding workpieces to said workpiece holders; a stationary control means for operating said feeding means at a feeding station; a set of tool holders mounted on said tool carrier; a set of tools respectively mounted in said tool holders and adapted to perform operations on workpieces held in said workpiece holders when said workpiece holders and said tool holders are in a predetermined relative position in which pairs of workpiece holders and tool holders are associated; transmission means connecting said workpiece carrier with said tool carrier for turning said tool carrier in an oscillating movement while said workpiece carrier moves through each of said angular distances, said transmission means turning during each oscillating movement said tool carrier at the rotary speed of said workpiece carrier in said one direction so that said pairs of tool holders and workpiece holders move together, and returning said tool carrier with said tool holders and tool in an opposite direction until said tool holders are again in said predetermined position relative to said workpiece holders; a stationary support; and a plurality of control means mounted on said support and engaging selected holders of each pair of workpiece holders and tool holders during movement of said tool carrier and workpiece carrier in said one direction for operating the respective holders whereby successive operations are performed by said tools on workpieces, said control means releasing the respective holders during return movement of said tool carriers.

13. In an automatic machine tool, in combination, a rotary work piece carrier; a set of workpiece holders mounted on said workpiece carrier spaced the same angular distance from each other; drive means for continuously rotating said workpiece carrier in one direction about an axis; an oscillatable tool carrier turnable about the axis of said workpiece carrier; feeding means on said tool carrier for feeding workpieces to said workpiece holders; a stationary control means for operating said feeding means at a feeding station; a stationary control means located at a delivery station for operating said workpiece holders to release workpieces at the delivery station; a set of tool holders mounted on said tool carrier; a set of tools respectively mounted in said tool holders and adapted to perform operations on workpieces held in said workpiece holders when said workpiece holders and said tool holders are in a predetermined relative position in which pairs of workpiece holders and tool holders are associated; transmission means connecting said workpiece carrier with said tool carrier for turning said tool carrier in an oscillating movement while said workpiece carrier moves through each of said angular distances, said transmission means turning during each oscillating movement said tool carrier at the rotary speed of said workpiece carrier in said one direction so that said pairs of tool holders and workpiece holders move together, and returning said tool carrier with said tool holders and tool in an opposite direction until said tool holders are again in said predetermined position relative to said workpiece holders; a stationary support; and a plurality of control means mounted on said support and engaging selected holders of each pair of workpiece holders and tool holders during movement of said tool carrier and workpiece carrier in said one direction for operating the respective holders whereby successive operations are performed by said tools on workpieces, said control means releasing the respective holders during return movement of said tool carriers.

14. In an automatic machine tool, in combination, a rotary work piece carrier; a set of rotatable workpiece holders mounted on said workpiece carrier spaced the same angular distance from each other; drive means for continuously rotating said workpiece carrier in one direction about an axis; an oscillatable tool carrier turnable about the axis of said workpiece carrier; a set of tool holders mounted on said tool carrier; a set of tools including a series of thread cutting tools for performing successive thread cutting operations on the workpieces and being respectively mounted in said tool holders and adapted to perform operations on workpieces held in said workpiece holders when said workpiece holders and said tool holders are in a predetermined relative position in which pairs of workpiece holders and tool holders are associated; transmission means connecting said workpiece carrier with said tool carrier for turning said tool carrier in an oscillating movement while said workpiece carrier moves through each of said angular distances, said transmission means turning during each oscillating movement said tool carrier at the rotary speed of said workpiece carrier in said one direction so that said pairs of tool holders and workpiece holders move together, and returning said tool carrier with said tool holders and tool in an opposite direction until said tool holders are again in said predetermined position relative to said workpiece holders; a stationary support; and a plurality of control means mounted on said support and engaging selected holders of each pair of workpiece holders and tool holders during movement of said tool carrier and workpiece carrier in said one direction for operating the respective holders, selected control means rotating said workpiece holders during the thread cutting operations whereby successive operations are performed by said tools on workpieces, said control means releasing the respective holders during return movement of said tool carriers.

15. In an automatic machine tool, in combination, a rotary work piece carrier; a set of rotatable workpiece holders mounted on said workpiece carrier spaced the same angular distance from each other; drive means for continuously rotating said workpiece carrier in one direction about an axis; an oscillatable tool carrier turnable about the axis of said workpiece carrier; a set of tool holders mounted on said tool carrier; a set of tools including a series of thread cutting tools for performing successive thread cutting operations on the workpieces and being respectively mounted in said tool holders and adapted to perform operations on workpieces held in said workpiece holders when said workpiece holders and said tool holders are in a predetermined relative position in which pairs of workpiece holders and tool holders are in a predetermined relative position in which pairs of workpiece holders and tool holders are associated; transmission means connecting said workpiece carrier with said tool carrier for turning said tool carrier in an oscillating movement while said workpiece carrier moves through each of said angular distances, said transmission means turning during each oscillating movement said tool carrier at the rotary speed of said workpiece carrier in said one direction so that said pairs of tool holders and workpiece holders move together, and returning said tool carrier with said tool holders and tool in an opposite direction until said tool holders are again in said predetermined position relative to said workpiece holders; a stationary support; and a plurality of control means mounted on said support and engaging selected holders of each pair of workpiece holders and tool holders during movement of said tool carrier and workpiece carrier in said one direction for operating the respective holders through at least one complete revolution, selected control means rotating said workpiece holders during the thread cutting operations whereby successive operations are performed by said tools on workpieces, said control means releasing the respective holders during return movement of said tool carriers.

16. In an automatic machine tool, in combination, a rotary workpiece carrier; a set of workpiece holders mounted on said workpiece carrier spaced the same angular distance from each other, and including movable workpiece holders; drive means for continuously rotating said workpiece carrier in one direction about an axis; an oscillatable tool carrier turnable about the axis of said workpiece carrier; a set of tool holders mounted on said tool carrier, and including movable tool holders, said movable workpiece holders being rotatable about an axis extending in radial direction to the axis of said carriers; means for supporting tool holders associated with said rotary workpiece holders for movement parallel and transverse to the axis of the respective associated workpiece holder, and also parallel to the axis of said carrier; a set of tools respectively mounted in said tool holders and adapted to perform operations on workpieces held in said workpiece holders when said workpiece holders and said tool holders are in a predetermined relative position in which pairs of workpiece holders and tool holders are associated; transmission means connecting said workpiece carrier with said tool carrier for turning said tool carrier in an oscillating movement while said workpiece carriers move through each of said angular distances, said transmission means turning during each oscillating movement said tool carrier at the rotary speed of said workpiece carrier in said one direction so that said pairs of tool holders and workpiece holders move together, and returning said tool carrier with said tool holders and tool in an opposite direction until said tool holders are again in said predetermined position relative to said workpiece holders; a stationary support; and a plurality of control means mounted on said support and including first control means for engaging and operating said movable workpiece holders, and second control means for engaging and operating said movable tool holders during movement of said tool carrier and workpiece carrier in said one direction whereby successive operations are performed by said tools on workpieces, said control means releasing the respective holders during return movement of said tool carriers.

17. In an automatic machine tool, in combination, a rotary workpiece carrier; a set of workpiece holders mounted on said workpiece carrier spaced the same angular distance from each other, and including movable workpiece holders; drive means for continuously rotating said workpiece carrier in one direction about an axis; an oscillatable tool carrier turnable about the axis of said workpiece carrier; a set of tool holders mounted on said tool carrier, and including movable tool holders said movable workpiece holders being rotatable about an axis extending in radial direction to the axis of said carriers; means for supporting tool holders associated with said rotary workpiece holders for movement parallel and transverse to the axis of the respective associated workpiece holders, and also parallel to the axis of said carrier; supporting means for supporting said movable tool holders for turning movement about an axis parallel to the axis of said carriers, said last-mentioned supporting means being secured to the underside of said oscillatable tool carrier and being turnable about an axis parallel to the axis of the respective workpiece holder and extending in radial direction with respect to the axis of said carriers; a set of tools respectively mounted in said tool holders and adapted to perform operations on workpieces held in said workpiece holders when said workpiece holders and said tool holders are in a predetermined relative position in which pairs of workpiece holders and tool holders are associated; transmission means connecting said workpiece carrier with said tool carrier for turning said tool carrier in an oscillating movement while said workpiece carrier moves through each of said angular distances, said transmission means turning during each oscillating movement said tool carrier at the rotary speed of said workpiece carrier in said one direction so that said pairs of tool holders and workpiece holders move together, and returning said tool carrier with said tool holders and tool in an opposite direction until said tool holders are again in said predetermined position relative to said workpiece holders; a stationary support; and a plurality of control means mounted on said support and including first control means for engaging and operating said movable workpiece holders, and second control means for engaging and operating said movable tool holders during movement of said tool carrier and workpiece carrier in said one direction whereby successive operations are performed by said tools on workpieces, said control means releasing the respective holders during return movement of said tool carriers.

18. In an automatic machine tool, in combination, a rotary workpiece carrier; a set of workpiece holders mounted on said workpiece carrier spaced the same angular distance from each other, and including movable workpiece holders; drive means for continuously rotating said workpiece carrier in one direction about an axis; an oscillatable tool carrier turnable about the axis of said workpiece carrier; a set of tool holders mounted on said tool carrier, and including movable tool holders said movable workpiece holders being rotatable about an axis extending in radial direction to the axis of said carriers; means for supporting tool holders associated with said rotary workpiece holders for movement parallel and transverse to the axis of the respective associated workpiece holder, and also parallel to the axis of said carrier; supporting means for supporting said movable tool holders for turning movement about an axis parallel to the axis of said carriers, said last-mentioned supporting means being secured to the underside of said reciprocable tool carrier and being turnable about an axis parallel to the axis of the respective workpiece holder and extending in radial direction with respect to the axis of said carriers; a set of tools respectively mounted in said tool holders and adapted to perform operations on workpieces held in said workpiece holders when said workpiece holders and said tool holders are in a predetermined relative position in which pairs of workpiece holders and tool holders are associated; transmission means connecting said workpiece carrier with said tool carrier for turning said tool carrier in an oscillating movement while said workpiece carrier moves through each of said angular distances, said transmission means turning during each oscillating movement said tool carrier at the rotary speed of said workpiece carrier in said one direction so that said pairs of tool holders and workpiece holders move together, and returning said tool carrier with said tool holders and tool in an opposite direction until said tool holders are again in said predetermined position relative to said workpiece holders; a stationary support; and a plurality of control means mounted on said support and including first control means for engaging and operating said movable workpiece holders, and second control means for engaging and operating said movable tool holders during movement of said tool carrier and workpiece carrier in said one direction, said second control means including a guide rail for guiding a turning tool along the outline of the workpiece in a position normal to said outline whereby successive operations are performed by said tools on workpieces, said control means releasing the respective holders during return movement of said tool carriers.

References Cited in the file of this patent
UNITED STATES PATENTS

| | | |
|---|---|---|
| 2,028,225 | Larson | Jan. 21, 1936 |
| 2,642,594 | Fray | June 23, 1953 |